E. B. SPALT AND F. R. MEGINNISS.
CONTROL FOR REFRIGERATING APPARATUS.
APPLICATION FILED SEPT. 7, 1918.
1,418,488.
Patented June 6, 1922.
3 SHEETS—SHEET 1.
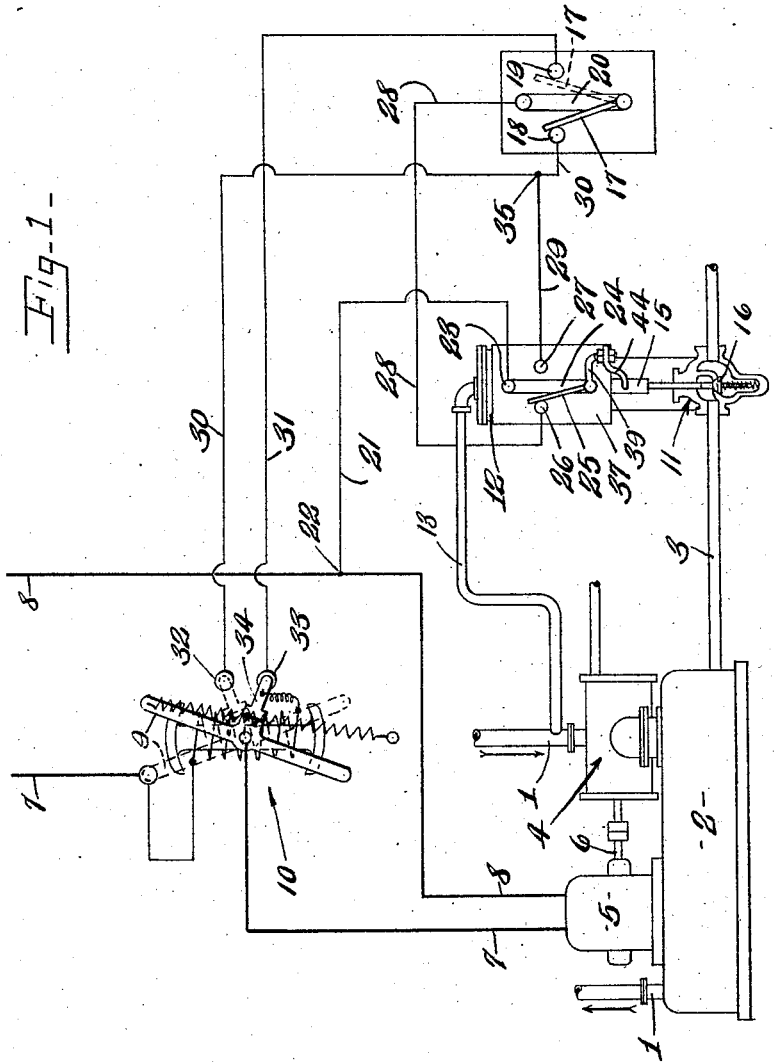
Edward B. Spalt & Francis R. Meginniss, INVENTORS
BY
Parsons & Bodell, ATTORNEYS.

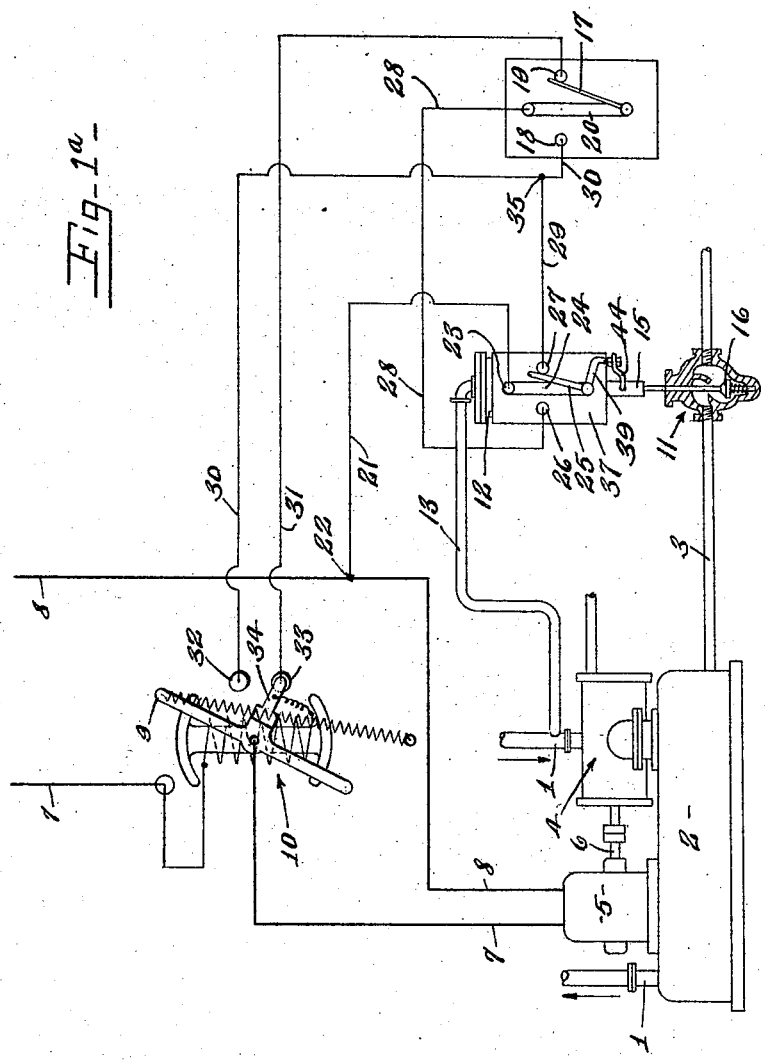

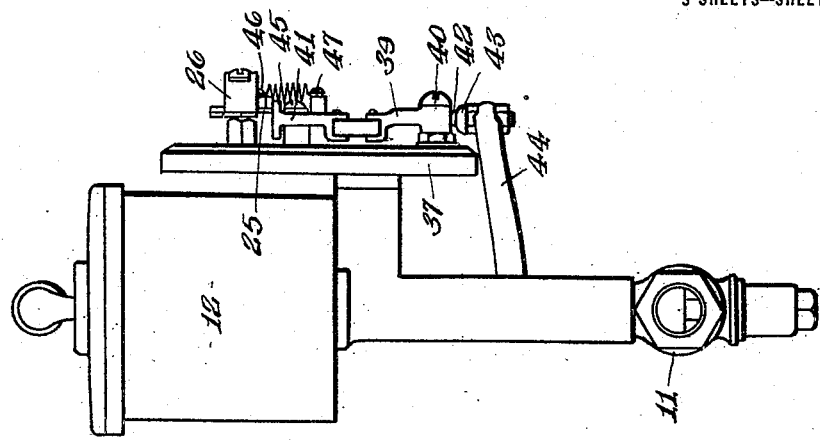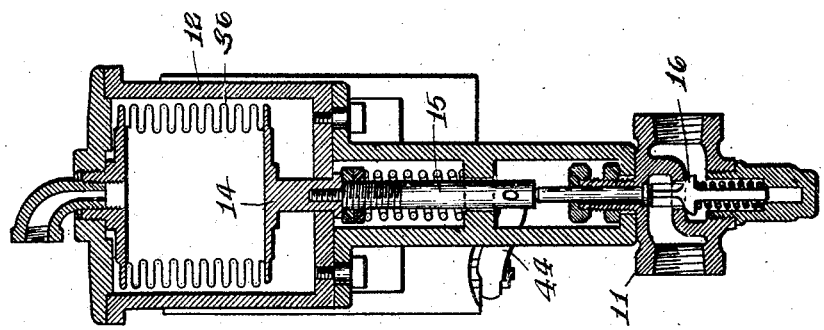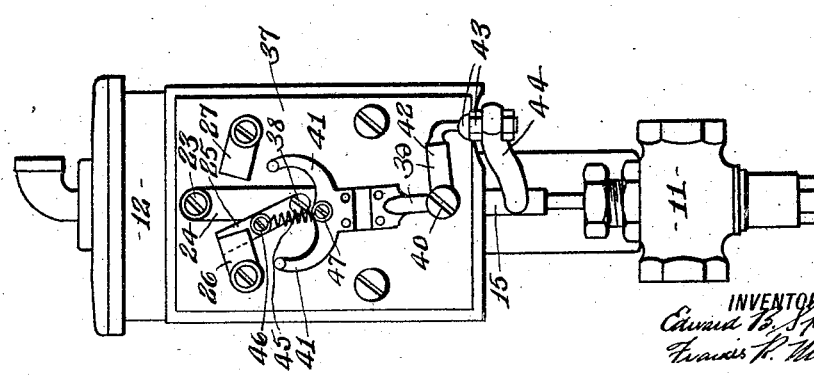

UNITED STATES PATENT OFFICE.

EDWARD B. SPALT AND FRANCIS R. MEGINNISS, OF ALBANY, NEW YORK, ASSIGNORS TO GEO. SPALT & SONS, INC., OF ALBANY, NEW YORK. A CORPORATION OF NEW YORK.

CONTROL FOR REFRIGERATING APPARATUS.

1,418,488.  Specification of Letters Patent.  Patented June 6, 1922.

Application filed September 7, 1918. Serial No. 253,120.

*To all whom it may concern:*

Be it known that we, EDWARD B. SPALT and FRANCIS R. MEGINNISS, citizens of the United States, and residents of Albany, in the county of Albany and State of New York, have invented a certain new and useful Control for Refrigerating Apparatus, of which the following is a specification.

This invention relates to refrigerating apparatus and has for its object a particularly simple and efficient means for controlling the operation of the apparatus by the pressure in the circulating system, which means is particularly simple in construction and highly efficient and durable in use; and the invention consists in the novel features and in the combinations and constructions hereinafter set forth and claimed.

In describing this invention, reference is had to the accompanying drawings in which like characters designate corresponding parts in all the views.

Figures 1 and 1ª are diagrammatic views of this apparatus showing the operation and position of the parts when the pressure operated switch assumes different positions.

Figures 2, 3 and 4 are respectively, a front elevation, a side elevation, and a vertical sectional view of the controlling means.

This apparatus comprises, generally, a circulating system for an expansible refrigerant as ethylchloride, a condenser, a compressor, an electric motor for actuating the compressor, a switch in the feed circuit for the motor, remote control means for the switch, a branch electric circuit connected to the remote controlling means for the switch, and a switch in the branch circuit and automatically operated by the pressure in the circulating system, the pressure operated switch operating to close a circuit through the remote control means when the pressure in the circulating system rises above a predetermined point.

In the illustrated embodiment of my invention, the refrigerating apparatus also includes a thermostatic switch connected in the branch circuit, the thermostatic switch being controlled by the temperature in the refrigerator and operating to close a branch circuit when a minimum temperature is obtained and hence cause the remote control switch to open so that the motor will stop and to close a branch circuit when the temperature rises to a predetermined maximum degree in order to close said switch so that the motor is again started.

1 designates the outlet pipe for the expansible refrigerant, such pipe being located on the discharge side of the apparatus or between the apparatus and the chamber to be refrigerated.

2 is a condenser in which are located cooling coils through which water or other cooling medium is passed, the coils being connected to a supply pipe 3.

4 is the compressor or pump for circulating the refrigerant through the circulating system and compressing the same in the condensor.

5 is the electric motor which is connected by a shaft 6 to the movable member of the compressor.

7 and 8 are the feed wires for supplying current to the motor.

9 is an electric switch located in the feed circuit, and 10 designates remote control means for operating the switch 9. As this means may be of any suitable form, size and construction, it is thought that description thereof is unnecessary.

11 is a valve casing connected in the water supply pipe 3, and 12 is the casing of a pressure device which is connected by a pipe 13 to the circulating pipe 1, the pressure device including a movable member 14 located in the casing 12 and connected by means of a rod 15 to a movable valve piece 16 located in the valve casing 11 and serving to open and close pipe 3.

17 is a thermostatic switch located in the refrigerating chamber and movable between two contacts 18 and 19 and being permanently connected to a conductor 20.

The contacts 18 and 19 and conductor 20 are located in a branch circuit leading from one leg of the feed circuit and connected to the remote control means 10 to operate the same, the branch circuit including a line 21 connected at 22 to the feed wire 8 and at 23 to a conductor 24 forming parts of the pressure operated switch to be hereinafter described and connected by the switch arm 25 of said pressure operated switch to either of two terminals 26, 27, wires 28 and 29 connected respectively to the terminals 26 and 27, the wire 28 being connected to the conductor 20, wires 30 and 31 connected respectively to the terminals 18 and 19 and connected to terminals 32, 33 with which the three-way switch 9 of the remote control means coacts.

The wire 29 connected to the terminal 27 of the pressure operated switch is connected at 35 to the wire 30.

The member 14 consists of an expansible member as a bellows 36, the interior of which communicates with the pipe 13.

The switch arm 25 is operated into engagement with the contact 27 by the movement of the rod 15 when the pressure in the circulating system rises to a predetermined amount and expands the bellows 36 sufficiently to move the rod 15 downwardly a predetermined amount; and the switch arm is operated out of engagement with the contact 27 and into engagement with the contact 26 by the spring acting in opposition to the pressure in the bellows 36 when the tension of the spring is greater than the pressure within the bellows.

As here shown, the pressure operated switch is mounted upon a plate or panel board 37 on the outside of the casing 12 and the switch arm 25 is pivoted at 38 at one end on the conductor 24 and is movable on its pivot into and out of engagement with the contacts 26, 27.

The connections for operating the switch arm 25 include an angle or bell crank lever 39 pivoted at 40 to the panel board 37 and having one arm thereof provided with branches 41 arranged to contact with the switch 25 to throw the same when the lever 39 has been moved a predetermined distance, and the other arm 42 thereof being connected by a ball-and-socket joint 43 to an arm 44 extending laterally from the rod 15.

As the rod 15 is moved downwardly owing to the increase in pressure in the bellows 36, the lever 39 will be rocked on its pivot until the left hand branch 41, Fig. 2, engages the switch member 25 and throws the same to the right into engagement with the contact 27.

As the pressure decreases and the rod 15 rises the right hand branch 41 of the lever 39 will engage the switch arm 25 and turn the same into the position shown in Fig. 1.

In order to affect a quick make-and-break action a spring 45 is connected at one end at 46 to the switch arm 25 and at its other end at 47 to the lever 39.

This spring shifts from either side to the other of a dead center line passing through the pivots 40 and 47 and when passing toward and into the dead center line the spring is tensioned and when the spring passes to the opposite side of the dead center line, the spring contracts and effects a quick break action. As the pressure operated member 14 moves downwardly, that is, as the bellows 36 expand under the pressure in the circulating system, the valve piece 16 is opened to permit more water to enter the condenser and hence have a greater cooling or condensing effect so that the pressure will be reduced. The combined action of the compressor and the condenser causes an average pressure to be maintained and the motor to keep on running subject of course to the thermostatic control 17.

Under normal running conditions, when the water supply is sufficient, the pressure operated switch arm 25 is in engagement with the contact 26 as seen in Fig. 1. Normally, the apparatus operates as follows:—

When the temperature is sufficiently low, say—at freezing point, the thermostatic switch arm 17 engages the contact 18 as indicated in full lines, Fig. 1, and the remote control switch is "off" as indicated in full lines, Fig. 1 with its arm 34 engaged with the contact 33. As this switch 9 is "off" the refrigerating plant is idle. When the temperature rises in the refrigerator, the thermostatic switch arm 17 engages the contact 19, whereupon the current passes through the wire 8, wire 21, conductor 24, switch arm 25 of the pressure operated switch, wire 28, conductor 20, thermostat switch arm 17, contact 19, wire 31, contact 33, through the magnet coil of the remote control means 10 of the switch 9, to line 7. Immediately, upon the energizing of the remote control means the switch arm 9 with its arm 34 is thrown into the position indicated in dotted lines, that is, its "on" position, so that the current now passes through line wire 8, motor 5, line wire 7 and switch 9 which is now in the position indicated in dotted lines, Fig. 1.

The motor 5 will now be actuated so that the plant will run until the temperature in the refrigerator falls sufficiently to cause the thermostatic switch arm 17 to again engage the contact 18 when the current will flow again from line wire 8, wire 21, conductor 24, pressure operated switch arm 25, wire 28, conductor 20, thermostatic switch arm 17, wire 30, switch 9 which is still in the position indicated in dotted lines, Fig. 1 and through the coils of the remote control means 10 to energize the magnet thereof and throw the switch 9 to its "off" position indicated in full lines, Fig. 1 and hence cut out the motor so that the plant is again idle.

In the normal running of the plant, when the supply of water through the valve 16 in the pipe 3 is sufficient to cool the expansible refrigerant, and hold down the pressure in the bellows 36 of the actuator for the valve 16, the switch arm 25 which is actuated by the pressure of the refrigerant in the bellows 36 remains in engagement with the contact 26 but the valve 16 is fluctuating, that is, opening and closing more or less to regulate the water supply to the condenser 4 in accordance with the requirements thereof.

However, when the motor 5 is running and the water supply through the valve 16 is insufficient to hold down the pressure of the refrigerant gas within the requirements, and the bellows 36 are expanded by such pressure to open the valve 16 so wide that the pressure operated switch arm 25 is snapped into engagement with the contact 27 as seen in Fig. 1ª, then, bearing in mind that the remote control switch arm 9 is in the dotted line position in Fig. 1, the current will now pass from line 8, wire 21, conductor 24, pressure operated switch arm 25, contact 27, wire 29, wire 30, contact 32, arm 34 of remote control switch arm and through the energizing coils of the magnet of the remote control switch to line wire 7, and hence the switch 9 is thrown into the position shown in Fig. 1ª and cut outs the motor 5, thus preventing damage to the condenser coils etc., due to over pressure of the refrigerant.

Now, assuming a very abnormal condition as follows, that the motor switch 9 is in its "off" position indicated in full lines, that while idle the thermostatic switch arm 17 is in its low temperature position in engagement with the contact 18 as indicated in full lines, Fig. 1; that while the motor is idle, the pressure of the refrigerant rises so as to shift the pressure operated switch arm 25 into contact with the contact 27 as in Fig. 1ª; that the water supply fails; and that the thermostatic switch arm in the meantime shifts to the high temperature position in engagement with the contact 19 as seen in full lines, Fig. 1ª, then the circuit cannot be closed through energizing coils of the remote control means 10 of the switch 9 to throw the switch 9 into closed position as the circuit is broken at the contact 32.

Hence, the motor and refrigerating plant can not run or continue to run when the water supply falls below the requirements of the apparatus.

What we claim is:

1. In a refrigerating apparatus, the combination of a circulating pipe for the expansible refrigerant, a condenser, a compressor, an electric motor for operating the compressor, an intake pipe for conducting a cooling medium to the condenser, a feed circuit for the motor, a switch in one leg of said circuit, a remote control switch for opening and closing the first switch comprising a switch arm, and a pair of contacts with which the arm alternately engages, a thermostatic switch comprising a switch arm, and contacts with which the thermostatic switch arm alternately engages, conductors connecting the contacts of the thermostatic switch with the contacts of the remote control switch, a pressure operated switch comprising a movable switch arm, and contacts with which the arm alternately engages, one of the last mentioned contacts being connected by a conductor to the arm of the thermostatic switch and the other contact being connected by a conductor to one of the contacts of the thermostatic switch, a conductor connecting the arm of the pressure operated switch and the other leg of the feed circuit, a pipe for conducting a cooling medium to the condensor, a valve for opening and closing such pipe, a pressure operated device connected to the valve to open and close the same, such device being connected to the circulating pipe for the expansible refrigerant, and connections between the valve and the switch arm of the pressure operated switch whereby this switch arm is shifted by the movement of the valve, substantially as and for the purpose described.

2. In a refrigerating apparatus, a circulating pipe for the expansible refrigerant, a condenser, a compressor, an electric motor for operating the compressor, and a feed pipe for supplying a cooling medium to the condenser, a main electric circuit having its legs connected to the motor to supply current thereto, a switch in one leg of said circuit, remote control means connected to said switch to operate the same and including a movable switch member, and a pair of contacts which said member alternately engages, a thermostatic switch including a movable switch arm, and contacts with which the arm alternately engages, the contacts being connected respectively to the contacts of the remote control switch, a valve for opening and closing the feed pipe for the cooling medium, pressure operated means for opening and closing said valve, the pressure operated means being connected in the circulating pipe for the expansible refrigerant, a pressure operated switch including a pair of contacts, and a switch arm movable into alternate engagement with said contacts, the switch arm of the pressure operated switch being connected to the valve to be operated by the opening and closing movement of the valve, the pressure operated switch being electrically connected in the feed circuit and to the contacts of the remote control switch to close the circuit through the remote control switch, in either position of the thermostatic switch, substantially as and for the purpose specified.

In testimony whereof, we have hereunto signed our names at Albany, in the county of Albany, and State of New York, this 5th day of Aug., 1918.

EDWARD B. SPALT.
FRANCIS R. MEGINNISS.